(12) United States Patent
Halbur et al.

(10) Patent No.: US 8,272,565 B2
(45) Date of Patent: Sep. 25, 2012

(54) TRANSACTION CARD ASSEMBLY WITH TRANSACTION CARD AND AUXILIARY ITEM

(75) Inventors: Ted C. Halbur, Lino Lakes, MN (US); Rebecca Skinner, Minneapolis, MN (US); Jessica D. Eriksen, St. Paul, MN (US); Jessica Geisler, Minneapolis, MN (US); Timothy P. Clegg, Manhatten Beach, CA (US); Anthony V. Roberts, Rolling Hills Estates, CA (US)

(73) Assignee: Target Brands, Inc., Minneapolis, MN (US)

( * ) Notice: Subject to any disclaimer, the term of this patent is extended or adjusted under 35 U.S.C. 154(b) by 464 days.

(21) Appl. No.: 12/488,313

(22) Filed: Jun. 19, 2009

(65) Prior Publication Data

US 2010/0325037 A1    Dec. 23, 2010

(51) Int. Cl.
*G06K 5/00* (2006.01)
(52) U.S. Cl. .................. 235/380; 235/487; 235/492
(58) Field of Classification Search .................. 235/380, 235/487–495
See application file for complete search history.

(56) References Cited

U.S. PATENT DOCUMENTS

| | | |
|---|---|---|
| 1,330,089 A | 2/1920 | Plauche |
| 1,347,269 A | 7/1920 | Greble |
| 1,421,097 A | 6/1922 | Pente |
| 2,183,681 A | 12/1939 | Krout |
| 2,305,195 A | 12/1942 | Richter |
| 2,479,052 A | 8/1949 | Wallace |
| 2,965,981 A | 12/1960 | Giovetti |
| 2,991,578 A | 7/1961 | Messina |
| 3,172,531 A | 3/1965 | Shillman |
| 3,392,903 A | 7/1968 | Morgan, Jr. |
| 3,434,414 A | 3/1969 | Wright |
| 3,756,398 A | 9/1973 | Green et al. |
| 4,234,079 A | 11/1980 | Otake |
| 4,911,670 A | 3/1990 | McNicholas et al. |
| 5,133,496 A | 7/1992 | Davidson et al. |
| 5,249,670 A | 10/1993 | Simon |
| 5,326,964 A | 7/1994 | Risser |
| 5,667,248 A | 9/1997 | Mayer |
| 5,720,158 A | 2/1998 | Goade, Sr. |
| 5,740,957 A | 4/1998 | Wenkman |
| 5,777,305 A | 7/1998 | Smith et al. |

(Continued)

OTHER PUBLICATIONS

"Transaction Card Assembly With Subect and Stand Portions, Electrostatic Clings and a Backer," U.S. Appl. No. 12/201,335, filed Aug. 29, 2008.

(Continued)

*Primary Examiner* — Daniel St Cyr
(74) *Attorney, Agent, or Firm* — Griffiths & Seaton PLLC

(57) ABSTRACT

A transaction card assembly includes a transaction card, a foldable backer, and an article. The transaction card includes an account identifier fixedly connected thereto. The account identifier is machine readable by a point-of-sale terminal and links the transaction card to a financial account or record. The foldable backer supports the transaction card and defines an interior surface, an exterior surface opposite the interior surface, and a viewing aperture extending from the interior surface to the exterior surface. The article is coupled with the interior surface of the foldable backer such that a portion of the article is viewable through the viewing aperture when the foldable backer is in a folded configuration around the article. Stored-value cards, combinations, methods of facilitating use of a transaction product and other embodiments are also disclosed.

19 Claims, 10 Drawing Sheets

U.S. PATENT DOCUMENTS

| | | | |
|---|---|---|---|
| 5,779,516 | A | 7/1998 | Thorne |
| 5,829,790 | A | 11/1998 | Phillips |
| 6,006,988 | A | 12/1999 | Behrmann et al. |
| 6,206,750 | B1 | 3/2001 | Barad et al. |
| 6,273,780 | B1 | 8/2001 | Gardner |
| D450,790 | S | 11/2001 | James |
| 6,439,613 | B2 | 8/2002 | Klure |
| 6,439,953 | B1 | 8/2002 | Liu |
| 6,475,054 | B1 | 11/2002 | Liu |
| 6,493,970 | B1 | 12/2002 | McCarthy et al. |
| 6,543,809 | B1 | 4/2003 | Kistner et al. |
| 6,575,302 | B2 | 6/2003 | Robley, Jr. |
| 6,588,591 | B1 | 7/2003 | Schabert et al. |
| 6,604,976 | B2 | 8/2003 | Lenkoff |
| 6,643,962 | B1 | 11/2003 | Panec et al. |
| 6,666,332 | B1 | 12/2003 | DeWolf et al. |
| 6,666,378 | B2 | 12/2003 | Davila et al. |
| 6,715,795 | B2 | 4/2004 | Klure |
| 6,877,263 | B2 | 4/2005 | Clark |
| D510,102 | S | 9/2005 | Gray |
| 6,971,524 | B1 | 12/2005 | Voswinkel |
| 6,974,159 | B2 * | 12/2005 | Thompson et al. ............. 283/51 |
| 7,032,812 | B2 * | 4/2006 | Ostini ............................. 234/43 |
| 7,055,740 | B1 | 6/2006 | Schultz et al. |
| 7,204,048 | B2 | 4/2007 | Kershner et al. |
| 7,219,829 | B2 * | 5/2007 | Treat ........................... 229/92.8 |
| 7,252,197 | B1 | 8/2007 | Voswinkel |
| 7,252,225 | B2 | 8/2007 | Schultz et al. |
| 7,275,683 | B2 | 10/2007 | Lazarowicz et al. |
| 7,290,713 | B2 | 11/2007 | Dean et al. |
| 7,293,701 | B2 | 11/2007 | Halbur et al. |
| 7,316,343 | B2 | 1/2008 | Leifeld et al. |
| 7,316,357 | B2 | 1/2008 | Lindahl et al. |
| 7,360,710 | B2 | 4/2008 | Lindahl et al. |
| 7,374,095 | B2 | 5/2008 | Blank et al. |
| 7,409,788 | B2 | 8/2008 | Lauer et al. |
| 7,434,735 | B2 | 10/2008 | Dean et al. |
| 7,900,827 | B2 * | 3/2011 | Albers et al. .................. 235/380 |
| 2002/0100797 | A1 | 8/2002 | Hollingsworth et al. |
| 2003/0024970 | A1 | 2/2003 | Lonergan |
| 2005/0204600 | A1 | 9/2005 | Lauer et al. |
| 2005/0230460 | A1 | 10/2005 | Ristau |
| 2005/0277358 | A1 | 12/2005 | Isenberg |
| 2006/0151348 | A1 | 7/2006 | Willard |
| 2006/0187196 | A1 | 8/2006 | Underkoffler et al. |
| 2006/0283775 | A1 | 12/2006 | Mark |
| 2007/0241198 | A1 | 10/2007 | Halbur et al. |
| 2007/0266605 | A1 | 11/2007 | Halbur et al. |
| 2007/0272591 | A1 | 11/2007 | Voswinkel |
| 2007/0290052 | A1 | 12/2007 | Dean et al. |
| 2008/0119952 | A1 | 5/2008 | Smith et al. |

OTHER PUBLICATIONS

"Contactless Payments: Consumer Trends and Usage Preferences," firstdata.com, 2008, 2 pages.

Wade, Will, "First Data Sees Sticker Device as Mobile-Pay Bridge," American Banker, Aug. 25, 2008, 2 pages.

"Go-Tag™ Solution," firstdata.com, 2008, 2 pages.

"The Perfect Gift Card Box—BoxyWrap®," www.boxywrap.com, 2008, 10 pages.

"l Miss My Childhood: Flip and Fold Fashions," http://imissmychildhood.blogspot.com/2007/07/flip-and-fold-fashions.html, Jul. 18, 2007, 5 pages.

* cited by examiner

TRANSACTION CARD ASSEMBLY WITH TRANSACTION CARD AND AUXILIARY ITEM

BACKGROUND OF THE INVENTION

Stored-value cards and other transaction products come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction products provide a number of advantages to both the consumer and the retailer.

SUMMARY OF THE INVENTION

One aspect of the present invention relates to a transaction card assembly including a transaction card, a foldable backer, and an article. The transaction card includes an account identifier fixedly connected thereto. The account identifier is machine readable by a point-of-sale terminal and links the transaction card to a financial account or record. The foldable backer supports the transaction card and defines an interior surface, an exterior surface opposite the interior surface, and a viewing aperture extending from the interior surface to the exterior surface. The article is coupled with the interior surface of the foldable backer such that a portion of the article is viewable through the viewing aperture when the foldable backer is in a folded configuration around the article. Stored-value cards, methods of providing a financial transaction card and other embodiments of transaction cards or products and associated combinations are also disclosed.

BRIEF DESCRIPTION OF THE DRAWINGS

Embodiments of the invention will be described with respect to the figures, in which like reference numerals denote like elements, and in which.

DETAILED DESCRIPTION

Figure 1:
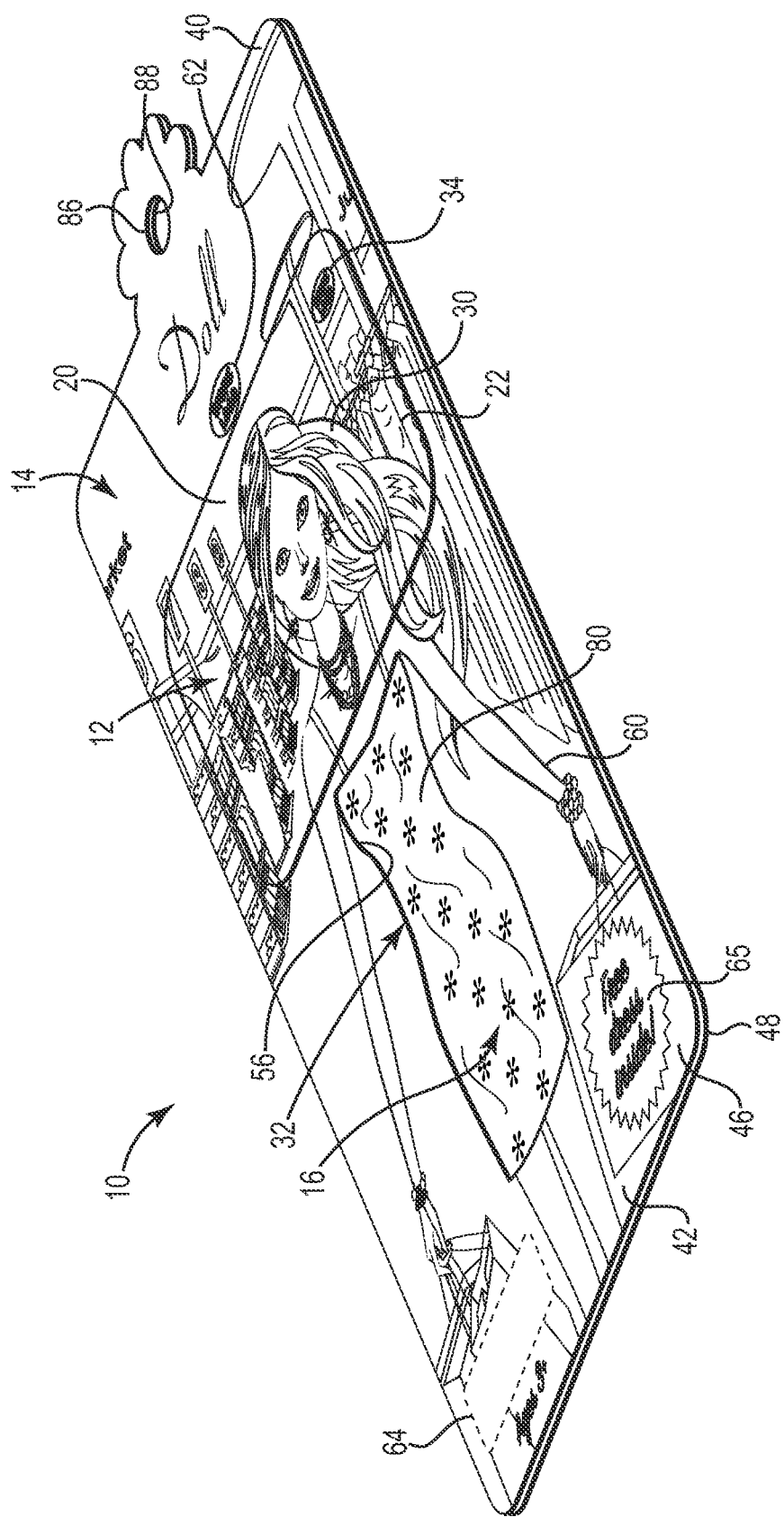
FIG. 1 is a front, perspective view illustration of a transaction card assembly in a closed position, according to one embodiment of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention.

A stored-value card or transaction product, such as a gift card, is adapted for making purchases of goods and/or services at, for example, a retail store or website. According to one embodiment, an original consumer buys a transaction card to give a recipient who in turn is able to use it to pay for goods and/or services. According to embodiments of the present invention, an assembly including the transaction card provides the consumer and/or recipient with an auxiliary product or article, such as a child's play product, configured for use separate from the financial functionality of the transaction card. For example, in one embodiment, the transaction card is provided on a backer, which also supports a dress or other clothing item for a doll. In one example, a cutout in the backer allows a portion of the dress to be viewed through the backer, and in one embodiment, is viewed through a hole in the backer that corresponds with a graphical depiction of a sample doll. Other synergistically depicted characters, scenes, or other subjects may additionally or alternatively be depicted by two or more of the collective group of the article, the backer, and the transaction card.

Turning to the figures, FIGS. 1-7 illustrate various views and/or portions of one embodiment of a transaction card assembly 10 including a stored-value, financial, or other transaction card 12, a carrier or backer 14, and an auxiliary item or article 16, for example, a play or novelty article. In one embodiment, backer 14 supports both transaction card 12 and article 16 such that each of transaction card 12, backer 14, and article 16 depict a different portion of a single subject. For example, backer 14 depicts a portion of a dressed doll, transaction card 12 depicts at least a head portion of the dressed doll, and article 16 depicts at least part of a clothing item, e.g., a dress, of the doll.

In one embodiment, transaction card 12 is formed of a substrate 20. Substrate 20 is any suitable material such as a somewhat rigid, yet flexible, material similar to that commonly used for identification cards, credit cards, etc. More specifically, in one embodiment, substrate 20 is a substantially planar member formed of paper, cardstock, plastic (e.g., polycarbonate, polystyrene, polyvinyl chloride (PVC), acrylonitrile butadiene styrene (ABS), polyethylene terephthalate (PET), teslin, polyactide (PLA) and acrylic), a composite thereof, or other suitable material. In one embodiment, substrate 20 is formed of injection molded plastic or cut from sheet-stock plastic material. Substrate 20 can be formed in any other suitable planar or non-planar configuration as will be apparent to those of skill in the art upon reading this application. In one embodiment, substrate 20 is formed as a substantially planar member having a readily perceivable thickness and defining a first or front surface 22 and a second or rear surface 24 opposite front surface 22. In one example, each of front surface 22 and rear surface 24 is substantially planar.

Figure 3:
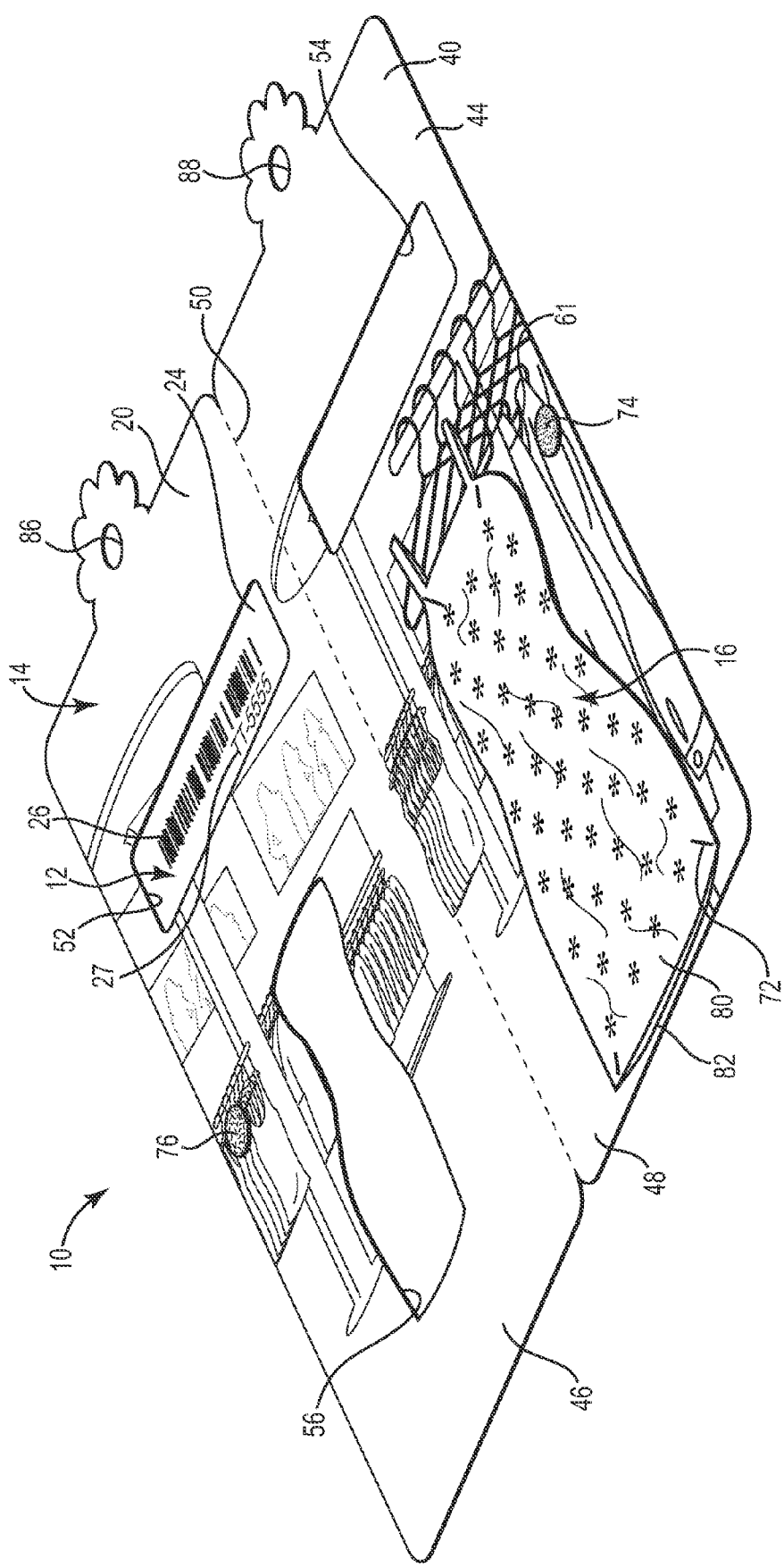
FIG. 3 is a front, perspective view illustration of the transaction card assembly of FIG. 1 in an open position, according to one embodiment of the present invention.
Figure 4:
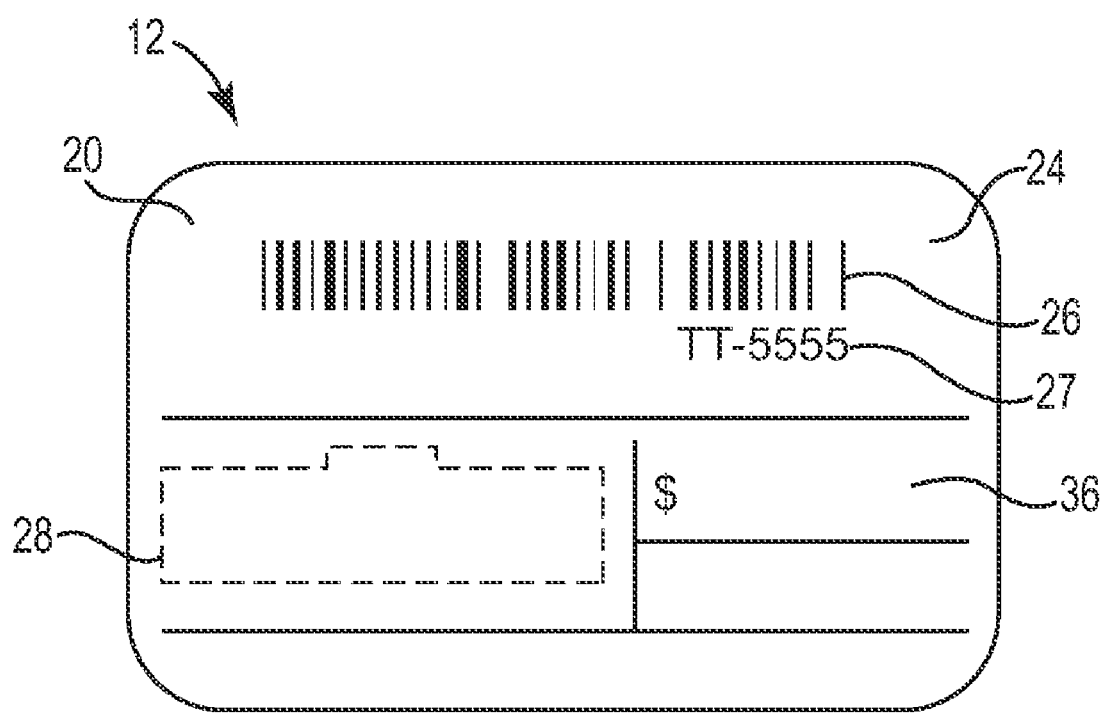
FIG. 4 is a rear view illustration of the transaction card assembly of FIG. 1, according to one embodiment of the present invention.

In one embodiment, transaction card 12 includes an account identifier 26 as illustrated in FIGS. 3 and 4, for example, embedded in substrate 20 or on at least one of front surface 22 and rear surface 24. Account identifier 26 includes one or more of a bar code, a magnetic strip, a smart chip or other electronic device, a radio frequency identification (RFID) device, or other suitable identifier readily machine readable by a point-of-sale terminal, account access station, kiosk or other suitable device. In one embodiment where account identifier 26 is machine readable, account identifier 26 is also readable by a bearer of transaction card 12 such that transaction card 12 can be used when a machine configured to read transaction card 12 is not present (e.g., when using transaction card 12 to make a purchase on a website). For example, account identifier 26 may include a number or letter string or a personal identification number (PIN) 27 (FIG. 4) identifying the associated account or record and/or a password (not illustrated) associated therewith. In one embodiment, account identifier 26 is printed on or otherwise applied or fixedly connected to rear surface 24 of substrate 20.

Account identifier 26 links transaction card 12 to a financial or other stored-value account or record, for example, by identifying the account or record. The account or record indicates a value or balance (e.g., monetary value, points, minutes, or other balance) associated with transaction card 12. In one embodiment, the account or record is maintained on a database, other electronic or manual record-keeping system, or, in the case of "smart cards" for example, on a chip or other electronic device on/in transaction card 12 itself. Accordingly, by scanning account identifier 26, the account or record linked to transaction card 12 is identified and can subsequently be activated, have amounts debited therefrom and/or have amounts credited thereto. Account identifier 26 is one example of means for linking transaction card 12 with an account or record.

Figure 2:
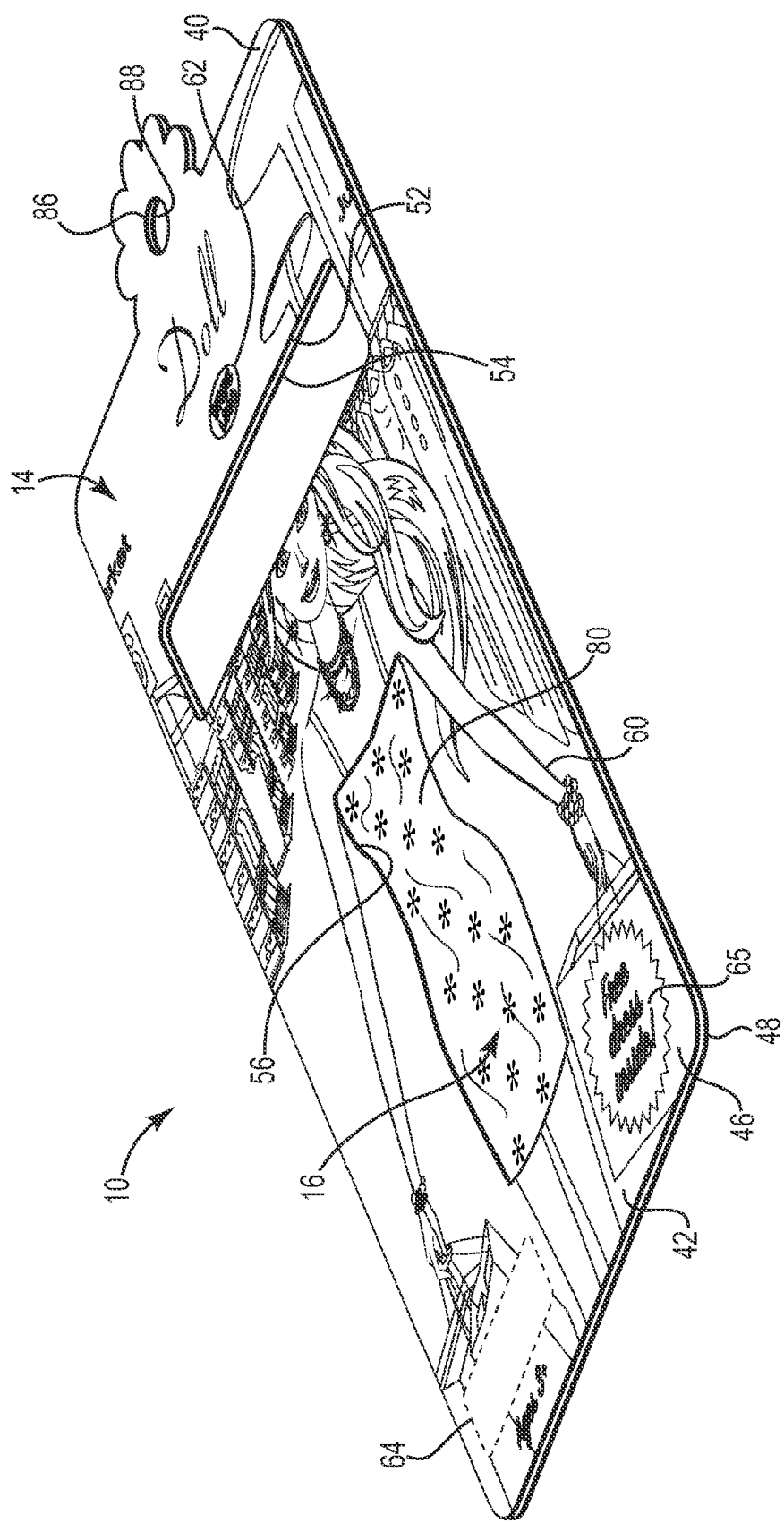
FIG. 2 is a front, perspective view illustration of the portion of the transaction card assembly of FIG. 1, according to one embodiment of the present invention.

In one embodiment, redemption indicia 28, which are generally indicated by a broken line box in FIG. 2, are included on transaction card 12 such as on rear surface 24 of substrate 20. Redemption indicia 28 indicate that transaction card 12 is redeemable for the purchase of goods and/or services and that, upon use, a value of the purchased goods and/or services will be deducted from the account or record linked to transaction card 12. In one embodiment, redemption indicia 28 include phrases such as "<NAME OF STORE> GiftCard" and "This GiftCard is redeemable for merchandise or services at any of our stores or at our website," and/or provides help or phone line information in the case of a lost, stolen or damaged stored-value card, etc.

Figure 5:
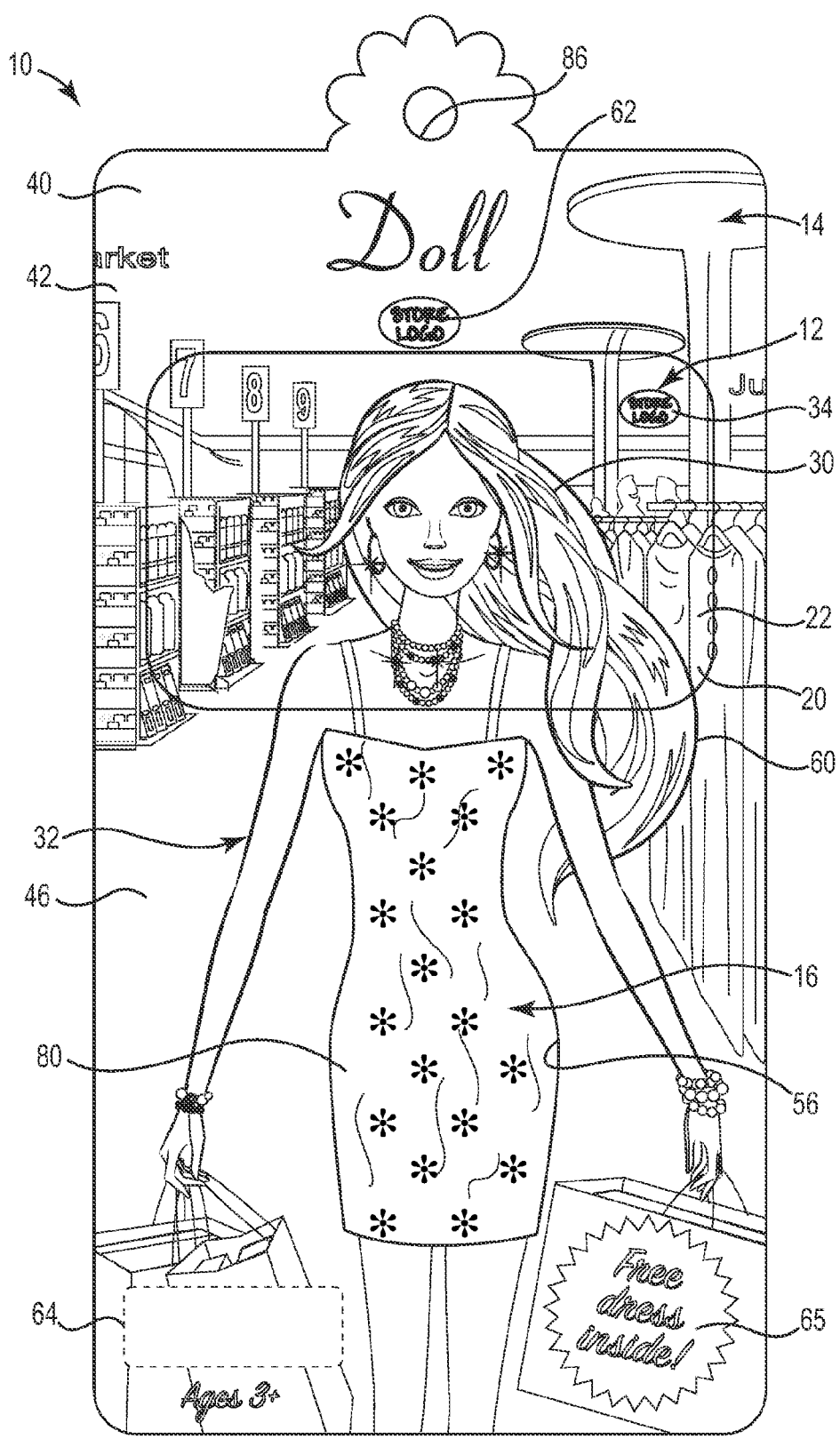
FIG. 5 is a front view illustration of the transaction card assembly of FIG. 1 in a closed position, according to one embodiment of the present invention.
Figure 6:
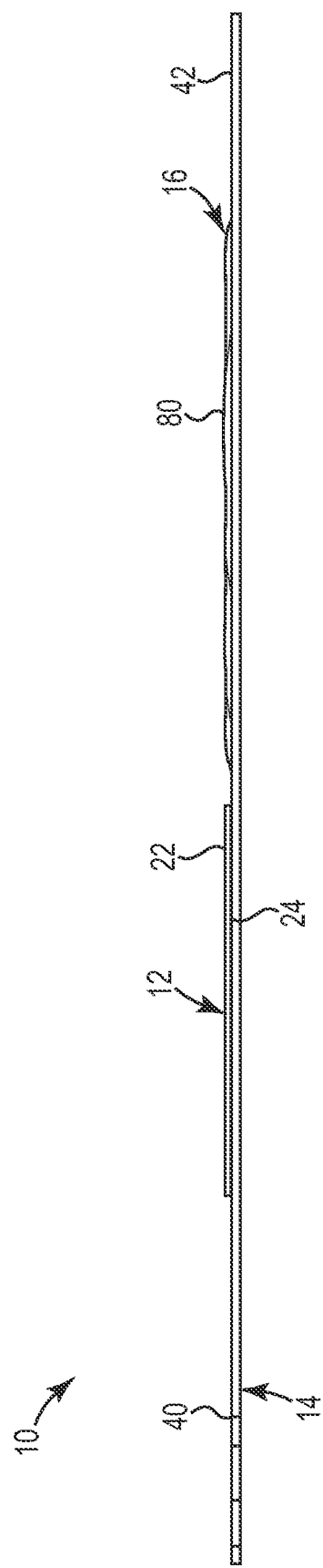
FIG. 6 is a left side view illustration of the transaction card assembly of FIG. 1 in a closed position, according to one embodiment of the present invention.

In one embodiment, transaction card 12 includes graphical indicia 30, for instance, on front surface 22. Graphical indicia 30 depict a portion of a subject 32, e.g., a character or scene. In one example, graphical indicia 30 depict at least a head or top portion of subject 32 where subject 32 is a dressed doll as illustrated in FIGS. 1 and 5. In one example, graphical indicia 30 are printed in any suitable manner such as using multiple color, foil, embossed, and/or other printing techniques as will be apparent to those of skill in the art upon reading the present application. According to the above and following description, transaction card 10 with graphical indicia 30 is one example of means for depicting a first portion of subject 32.

Transaction card 12 may include additional indicia such as any suitable graphics, text or combinations thereof. In one embodiment, additional indicia include one or more brand identifiers 34. Brand identifier 34 includes one or more of a logo, text, trademark, etc. that associates transaction card 12 with at least one of a product, a brand, a store, etc. In one example, the additional indicia define a write-in field 36 (FIG. 4) on exterior surface 42 configured to receive ink applied by the consumer or retail store employee indicating an amount added to and/or activated in an account or record linked to account identifier 26 as will be further described below.

As illustrated in FIGS. 1-3 and 5-7, in one embodiment, backer 14 is formed from a single or multiple layer material or substrate, for example, a paper, plastic, or composite material, in the form of a substantially planar member 40 such as a relatively stiff but bendable/flexible card. Substantially planar member 40 defines a first or exterior surface 42 and a second or interior surface 44 opposite exterior surface 42. In one instance, backer 14 is folded along at least one fold line 50 to define at least two panels, in one embodiment, front panel 46 and rear panel 48, one on each side of fold line 50. In one embodiment, when backer 14 is folded, interior surface 44 is substantially folded onto itself and/or substantially only exterior surface 42 is visible when folded backer 14 is externally viewed.

Figure 7:
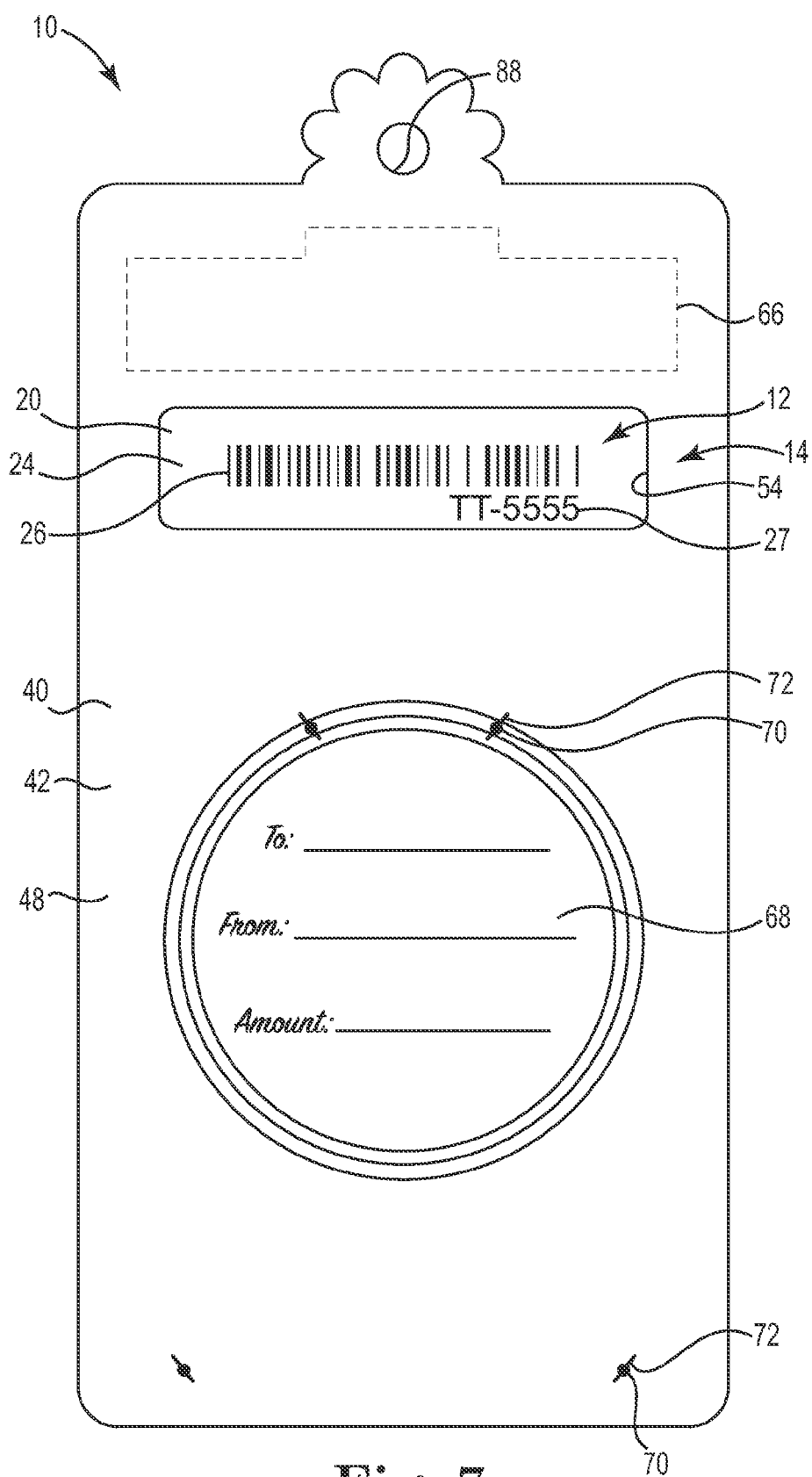
FIG. 7 is a rear view illustration of the transaction card assembly of FIG. 1 in a closed position, according to one embodiment of the present invention.

In one example, where backer 14 is bi-fold, backer 14 defines a first or front window or opening 52 and a second or rear window or opening 54. More specifically, front opening 52 is formed in front panel 46, and rear opening 54 is formed in rear panel 48. Front opening 52 and rear opening 54 are similarly sized and shaped and are positioned to correspond with one another when backer 14 is folded. When backer 14 is in the folded configuration, front opening 52 and rear opening 54 align, and, in one example, align such that perimeters of front opening 52 and rear opening 54 are substantially coextensive with one another. Accordingly, when backer 14 is in a folded configuration, front opening 52 and rear opening 54 collectively permit viewing entirely through backer 14, for example as illustrated in FIGS. 2 and 7.

In one embodiment, backer 14 defines an article viewing cutout or aperture 56, for example, through front panel 46. For example, backer 14 includes subject indicia 60 depicting a portion of subject 32 referenced above. In the illustrated embodiment, subject indicia 60 depict the limbs and surrounding environment of subject 32 including a character or other depiction as described above. In one example, viewing aperture 56 is sized and shaped to specifically correspond with a portion of subject 32 adjacent subject indicia 60. For instance, where, as illustrated, subject 32 is a character such as a doll, animated character, non-fictional character, etc., viewing aperture 56 is sized to correspond with an outfit or portion thereof, e.g., a dress, worn by subject 32 and is positioned such that viewing aperture 56 visually takes the place of the outfit or portion thereof. In this manner, anything viewed through viewing aperture 56 will appear as part of subject 32, more specifically, in one example, as a clothing item of the character subject. In view of the above and following disclosure, backer 14 with subject indicia 60 are one example of means for depicting a second portion of subject 32.

In one example, additional subject indicia 61 are included on interior surface 44 of backer 14. Additional subject indicia 61 may differ from subject indicia 60 but, in one embodiment, also correspond with article 16 to collectively present a larger overall subject than article 16 alone. For example, where article 16 is coupled with interior surface 44, additional subject indicia 61 corresponding thereto are adjacent article 16.

As illustrated, where article 16 is a dress, in one embodiment, additional subject indicia 61 depict a closet, clothing rack, retail display, etc. generally known to correspond with supporting a dress. Consequently, the resulting overall effect of viewing interior surface 44 and article 16 when backer 14 is in the unfolded configuration is of a dress hanging on a supporting structure. Such correspondence of article 16 to subject indicia 60 and/or additional subject indicia 61 collectively create a synergistic play item for the end consumer configured to encourage the end consumer's creativity and imagination especially when the end consumer is a child.

Backer 14 displays additional indicia, graphics or text information including store logo(s), store name(s), slogans, advertising, instructions, directions, brand indicia, promotional information, holiday indicia, seasonal indicia, media format identifiers, characters and/or other information. For example, in one embodiment, backer 14 includes brand indicia 62, which identify a store, brand, department, etc. and/or services associated with transaction card 12. Brand indicia 62 may be similar to or otherwise visually correspond with brand identifier 34 on transaction card 12.

In one example, backer 14 includes informational indicia 64 relating to article 16 and/or any other portion of transaction card assembly 10. In one embodiment, informational indicia 64 indicate that transaction card assembly 10 includes article 16, identify details of article 16 and/or transaction card 12, and/or include any warnings or age limits associated with any portion of transaction card assembly 10. In one embodiment, backer 14 includes promotional indicia 65 used to promote the contents and functional and amusing aspects of transaction card assembly 10. In one example, text or other depictions on backer 14 may simultaneously serve as informational indicia 64 and promotional indicia 65.

Referring to FIG. 7, in one embodiment, backer 14 includes redemption indicia 66, which is generally indicated as a dashed box for illustrative purposes, indicating that transaction card 12 is redeemable for the purchase of goods and/or services and that upon use, a value of the purchased goods and/or services will be deducted from the financial account or record linked to transaction card 12. In one embodiment, redemption indicia 66 include phrases such as "<NAME OF STORE> GiftCard" and "This GiftCard is redeemable for merchandise or services at any of our stores or at our website," and/or provides help or phone line information in case of a lost, stolen, or damaged transaction card 12, etc.

In one embodiment, backer 14 includes message field indicia 68 including to, from, amount, and/or message fields. Message field indicia 68 define areas of backer 14 configured to be written upon by a consumer to personalize backer 14 for presentation as a gift to a particular recipient, for a particular purpose, and/or to indicate a value of a corresponding transaction card 12.

Any of identifiers, indicia or fields 26, 28, 30, 34, 36, 64, 65, 66, and 68 or other indicia optionally may appear anywhere on backer 14 or transaction card 12. Additional information besides that specifically described and illustrated herein may also be included and/or one or more of identifiers or indicia 26, 28, 30, 34, 36, 64, 65, 66, and 68 may be eliminated.

As described above, backer 14 supports article 16 such that backer 14 is one example of means for supporting article 16. Article 16 is any suitable article configured to provide functionality and/or amusement to transaction card assembly 10 in addition to the financial functionality of transaction card 12. Article 16 may be a clothing item for a character, a playing card, a package, or any other suitable item(s). In one example, article 16 either is substantially flat (e.g., a playing card) or is configured to be relatively easily folded, compressed, or otherwise manipulated into a substantially flat configuration (e.g., a fabric clothing item, any other fabric item, and a selectively inflatable item). Accordingly, in one embodiment, article 16 includes a front side 80 and an opposing rear side 82.

In one embodiment, article 16 is coupled to interior surface 44 of backer 14. For example, as illustrated in the accompanying figures, rear side 82 of article 16 is fastened to extend over a portion of interior surface 44 defined by rear panel 48 such that article 16 aligns with viewing aperture 56 when backer 14 is in the closed configuration. Article 16 can be coupled to backer 14 in any suitable manner not significantly obscuring viewing of a surface of article 16 nearest to viewing aperture 56 as will be apparent to those of skill in the art upon reading this application. Due to the size and positioning of viewing aperture 56 as described above, a portion of article 16 viewed through viewing aperture 56 represents or depicts a portion of subject 32 as will be further described below. As such, embodiments of article 16 described herein are examples of three-dimensional means for depicting a portion of subject 32, and viewing aperture 56 is one example of means for providing visual access to article 16 through backer 14.

In one embodiment, article 16 is coupled to backer 14 without packaging, etc. in a manner configured to avoid permanently damaging or otherwise degrading article 16. As illustrated with reference to FIGS. 3 and 7, in one embodiment, backer 14 defines fastening holes 70, for example, through rear panel 48 and positioned such that article 16 covers fastening holes 70 when article 16 is viewed from front side 80 thereof. For instance, four fastening holes 70 are defined through rear panel 48 of backer 14 near four corners of article 16. Fasteners 72, such as plastic tag fasteners known in the art (i.e., plastic fasteners including a relatively small, elongated middle section with larger tabs on either end thereof extending substantially transverse to the elongated middle section) are thread through fastening holes 70 and are punched through article 16 or a package or tag thereof, for example, through each corner of article 16. In one embodiment, the relatively small size of fasteners 72 and a fabric nature of article 16 allow each fastener 72 to extend between fibers of article 16 resulting in little or no damage to article 16. Fasteners 72 are sized (e.g., are of a fairly small length) to hold article 16 close to rear panel 48 of backer 14. Article 16 can subsequently be removed from backer 14 by cutting or breaking fasteners 72 in a manner causing little if any discernable damage to article 16. Other fasteners and/or means for fastening article 16 to backer 14 other than the examples described above are also contemplated such as, for example, staples, removable adhesive, shrink wrapping, etc.

While, in one example, article 16 is substantially flat as described above, in one embodiment, article 16 has a more than negligible thickness. As such, to facilitate maintaining backer 14 in the closed or folded position, means for selectively securing front panel 46 to rear panel 48 together opposite fold line 50 is included. In one embodiment, a first securing component 74 is positioned opposite fold line 50 and coupled to a portion of interior surface 44 defined by front panel 46, and a corresponding second securing component 76 is positioned opposite fold line 50 and coupled to a portion of interior surface 44 defined by rear panel 48. First securing component 74 is configured to be selectively and repeatedly coupled with second securing component 76 when backer 14 is folded. For example, first securing component 74 is one of a hook component and a loop component of a hook-and-loop closure (e.g., such as the hook-and-loop type closures known as Velcro® brand closures manufactured by Velcro Industries B.V.), and second securing component 76 is the other of the hook component and the loop component. Other suitable selectively securable fasteners or configurations are also contemplated, such as a tab and corresponding receiving slit, snap, button, etc., which will be apparent to those of skill in the art upon reading the present application.

In one example, the thickness and fabric nature of article 16 causes article 16 to extend slightly up through viewing aperture 56 and in front of exterior surface 42 of front panel 46 (see, e.g., FIG. 6) creating a somewhat three-dimensional presentation. In one embodiment, a potential consumer or other individual observing the resultant transaction card assembly 10 is able to touch and tactilely perceive article 16 through viewing aperture 56 even while backer 14 is maintained in the folded configuration.

To facilitate hanging backer 14 supporting transaction card 12 and article 16, in one embodiment, backer 14 defines one or more hanging apertures 86 and 88. For example, first hanging aperture 86 is formed near a top of backer 14 through front panel 46, and second hanging aperture 88 is formed near a top of backer 14 through rear panel 48. In one embodiment, hanging apertures 86 and 88 align with one another when backer 14 is in a folded configuration such that a support rod, etc. in a retail display (not shown) is thread through both hanging apertures 86 and 88. By aligning two hanging apertures 86 and 88, the extra strength of two rather than a single panel of backer 14 is used to hang transaction card assembly 10 providing relatively strong support for transaction card assembly 10 including transaction card 12 and article 16, which add to the overall weight of transaction card assembly 10.

Figure 8:
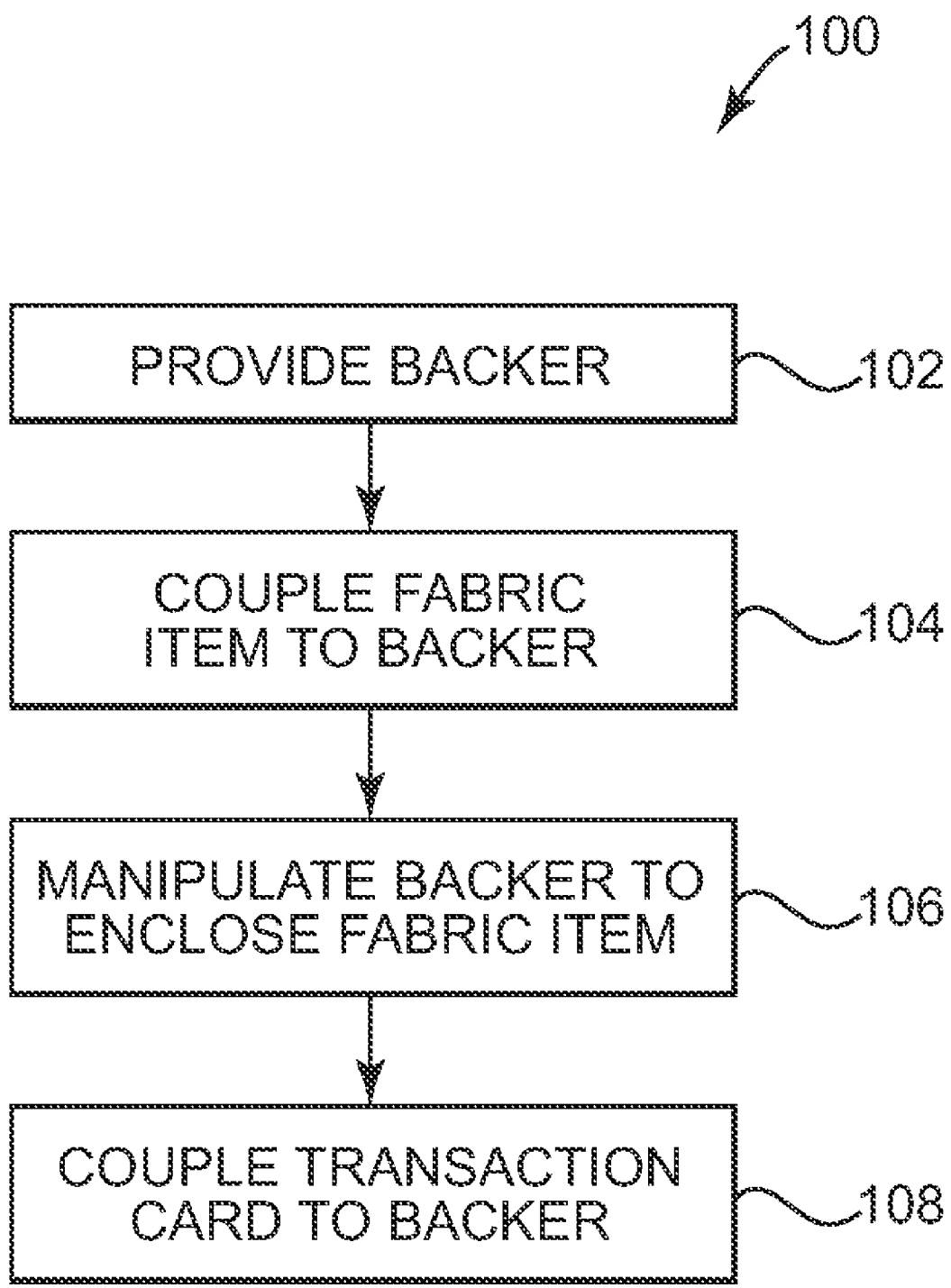
FIG. 8 is a flow chart illustrating a method of forming a transaction card assembly, according to one embodiment of the present invention.

FIG. 8 illustrates a method 100 of assembling transaction card assembly 10, according to one embodiment of the present invention where article 16 is a fabric item. However, it should be understood that a similar method can also be used in an embodiment where article 16 is not a fabric item. At 102, unfolded backer 14 in a substantially planar form is provided where, in one embodiment, backer 14 defines front opening 52, rear opening 54, and viewing aperture 56 on front and rear panels 46 and 48 thereof as described above.

At 104, article 16 is provided and coupled to backer 14. For example, rear side 82 of article 16 is coupled to a portion of interior surface 44 defined by rear panel 48 of backer 14. In one embodiment, article 16 is positioned on backer 14 to align with additional subject indicia 61 such that article 16 appears as a three-dimensional extension of additional subject indicia 61. In one embodiment, article 16 is coupled with backer 14 (e.g., a portion of interior surface 44 defined by one of front panel 46 and rear panel 48) to align with and substantially extend across an entirety of viewing aperture 56 in front panel 46 when backer 14 is eventually folded about fold line 50. Article 16 is secured in place relative to backer 14 in any suitable manner such as by inserting fasteners 72 through fastener holes 70, which were preformed in backer 14, and through a portion of article 16. In one embodiment, at least one fastener 72 is positioned on a first side of the viewing aperture 56 (e.g., above viewing aperture 56 in the orientation of FIGS. 5 and 7), and at least one fastener 72 is positioned on a second side of the viewing aperture 56 (e.g., below viewing aperture 56 in the orientation of FIGS. 5 and 7) opposite the first side when backer 14 is in the folded configuration. Such a configuration, holds article 16 is a position extending across viewing aperture 56 when backer 14 is in a folded configuration.

At 106, backer 14 is folded about fold line 50 or otherwise manipulated to enclose article 16. In one embodiment, folding backer 14 about fold line 50 brings first securing component 74 into contact with second securing component 76 in a manner selectively holding backer 14 in a folded configuration about article 16. Once folded, if not previously, article 16 extends across viewing aperture 56 such that when backer 14 is viewed from the front (e.g., the view illustrated in FIG. 5), article 16 is viewed through viewing aperture 56 and appears as a portion of the subject 32 along with subject indicia 60 of backer 14.

In one embodiment, at 108, transaction card 12 is coupled with backer 14 to complete assembly of transaction card assembly 10. For example, rear surface 24 of transaction card 12 is placed on or at least toward a portion of exterior surface 42 of front panel 46 of backer 14 and is coupled in place, e.g., using releasable adhesive, a skinning or overlay material, and/or other suitable technique. When transaction card 12 is placed on front panel 46, it is positioned such that account identifier 26 aligns with front opening 52 and, in one embodiment, rear opening 54, such that account identifier 26 can be viewed, scanned, or otherwise read through backer 14 from a rear portion thereof (see, e.g., FIG. 7 where account identifier 26 is viewable through both front opening 52 and rear opening 54). In view of at least the above description, front opening 52 and rear opening 54 are each examples of means for visually permitting access to account identifier 26. In one embodiment, transaction card 12 is placed on front panel 46 so as not to substantially obstruct viewing aperture 56 (i.e., such that viewing aperture 56 is substantially free from obstruction by transaction card 12). For example, transaction card 12 is spaced entirely from or only covers a very small portion of viewing aperture 56 when transaction card assembly 10 is viewed from the front.

According to the embodiment illustrated in FIGS. 1 and 3, in one example, the above-described placement of transaction card 12 also positions graphical indicia 30 to align with and/or otherwise correspond with subject indicia 60 on exterior surface 42 of front panel 46 and/or a portion of article 16 viewed through viewing aperture 56. For example, as illustrated, graphical indicia 30 depict head and shoulders of a character (e.g., a doll) and cohesively align with subject indicia 60, which depict a portion of the upper body and the limbs of the same character. Finally, as described above, article 16 (e.g., dress as illustrated) is seen through viewing aperture 56 and is shaped and positioned such that article 16 appears as a third portion of the character, such as the dressed or clothed portion. In this manner, subject 32 is collectively defined by transaction card 12, backer 14, and article 16, which each depict a different portion of subject 32. As such, each member of transaction card assembly 10 contributes to the overall synergistic effect and presentation of subject 32, in this case, of a doll or other character.

Notably, while method 100 is illustrated in an example utilizing a linear sequence of events, it should be understood that other orders of completing at least operations 104-108 are also contemplated. For example, operation 108 may be completed before either one of operations 104 and 106 or may be completed substantially simultaneously with one or both of operations 104 and 106 as will be apparent to those of skill in the art upon reading this application.

Figure 9:
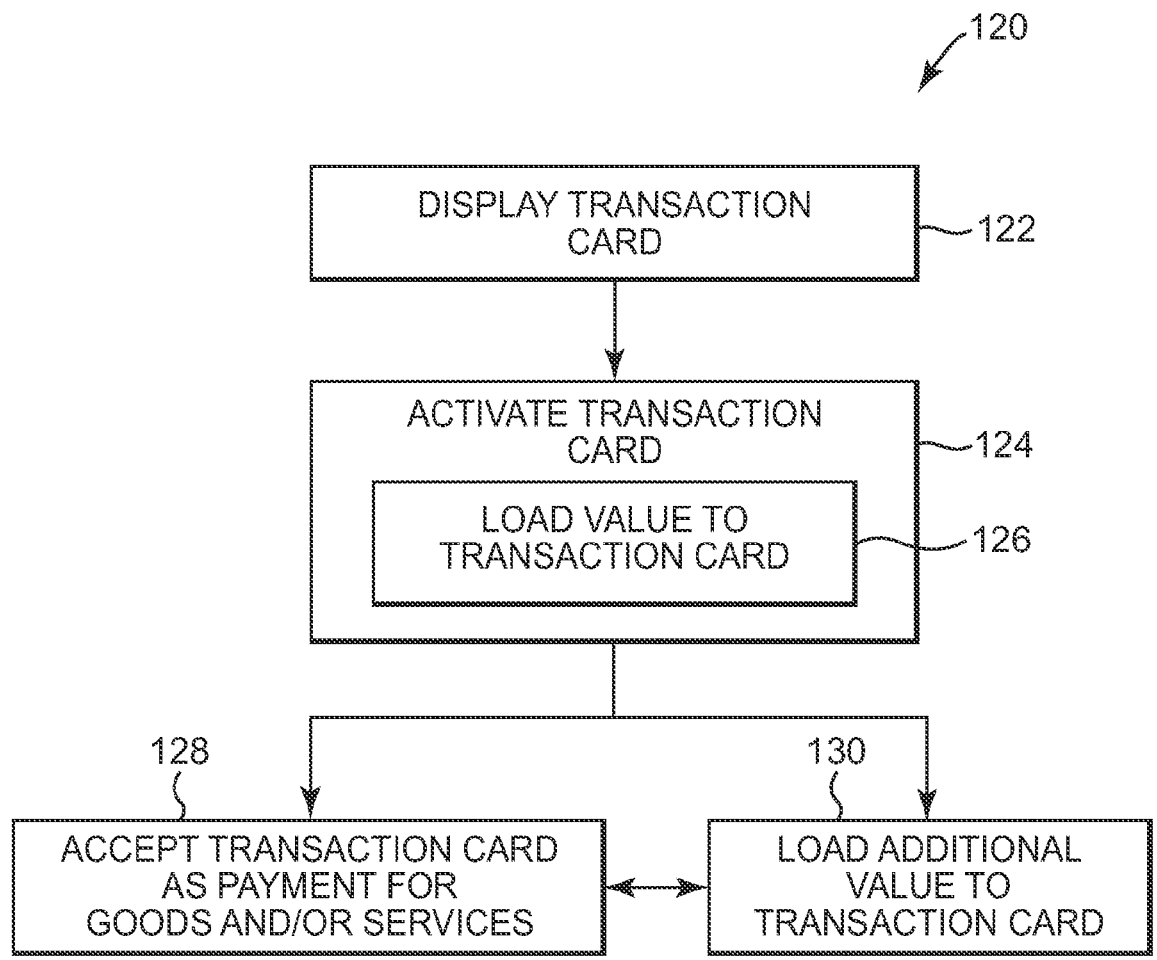
FIG. 9 is a flow chart illustrating a method of encouraging purchase and facilitating use of a transaction card assembly, according to one embodiment of the present invention.

FIG. 9 is a flow chart illustrating one embodiment of a method 120 of encouraging purchase and facilitating use of transaction card 12 by consumers and/or recipients. At 122, transaction card 12 is placed on or hung from a rack, shelf or other similar device to display transaction card 12 for sale to potential consumers, for example, via backer 14, more specifically, hang apertures 86 and 88. In one example, while transaction card 12 is hung in a retail store, potential consumers are able to touch and feel article 16 through viewing aperture 56 in a manner further promoting and encouraging purchase of transaction card assembly 10. In one embodiment, rather than hanging transaction card assembly 10 on a retail fixture, a depiction of transaction card 12 is placed on a website for viewing and purchase by potential consumers.

At 124, a consumer who has decided to purchase transaction card 12 presents transaction card 12 on backer 14 to a retail store employee, retail store kiosk, remote terminal, or other person or device to scan account identifier 26 to access an account or record linked to account identifier 26. In particular, account identifier 26 is scanned or otherwise accessed, for example through front opening 52 and rear opening 54 of backer 14 to activate transaction card 12. Upon accessing the account or record, then, at 126, value is added to the account or record in the form of monetary value, points, minutes, etc. Thus, transaction card 12 is activated and loaded. In one embodiment, value is already associated with the account or record linked to account identifier 26. In such an embodiment, account identifier 26 is scanned to activate the account or record and operation 126 may be eliminated.

Once transaction card 12 is activated and loaded, transaction card 12 can be used by the consumer or any other bearer of transaction card 12 to purchase goods and/or services at the affiliated retail setting (e.g., a retail store or website) or can be used in exchange for calling minutes, etc. In one embodiment, where transaction card 12 is displayed on a website at 122, then, at 124, transaction card 12 may be activated in any suitable method and may not require the physical scanning of account identifier 26 to be activated or to otherwise access the associated account or record such as at 126.

In one example, at 128, the retail store or other affiliated retail setting or website accepts transaction card 12 as payment toward the purchase of goods and/or services made by the current bearer of transaction card 12. In particular, the value currently loaded on transaction card 12 (i.e., value stored or recorded in the account or record linked to account identifier 26) is applied toward the purchase of goods and/or services. At 130, additional value is optionally loaded on transaction card 12 at a point-of-sale terminal, kiosk, website, or other area of the retail store or related setting.

Upon accepting transaction card 12 as payment at 128, the retail store or related setting can subsequently perform either operation 128 or operation 130 as requested by a current bearer of transaction card 12. Similarly, upon loading additional value on transaction card 12 at 130, the retail store or related setting can subsequently perform either operation 130 again or operation 128. In one example, the ability to accept transaction card 12 as payment for goods and/or services is limited by whether the account or record associated with transaction card 12 has any value stored or recorded therein at the time of attempted redemption.

Figure 10:
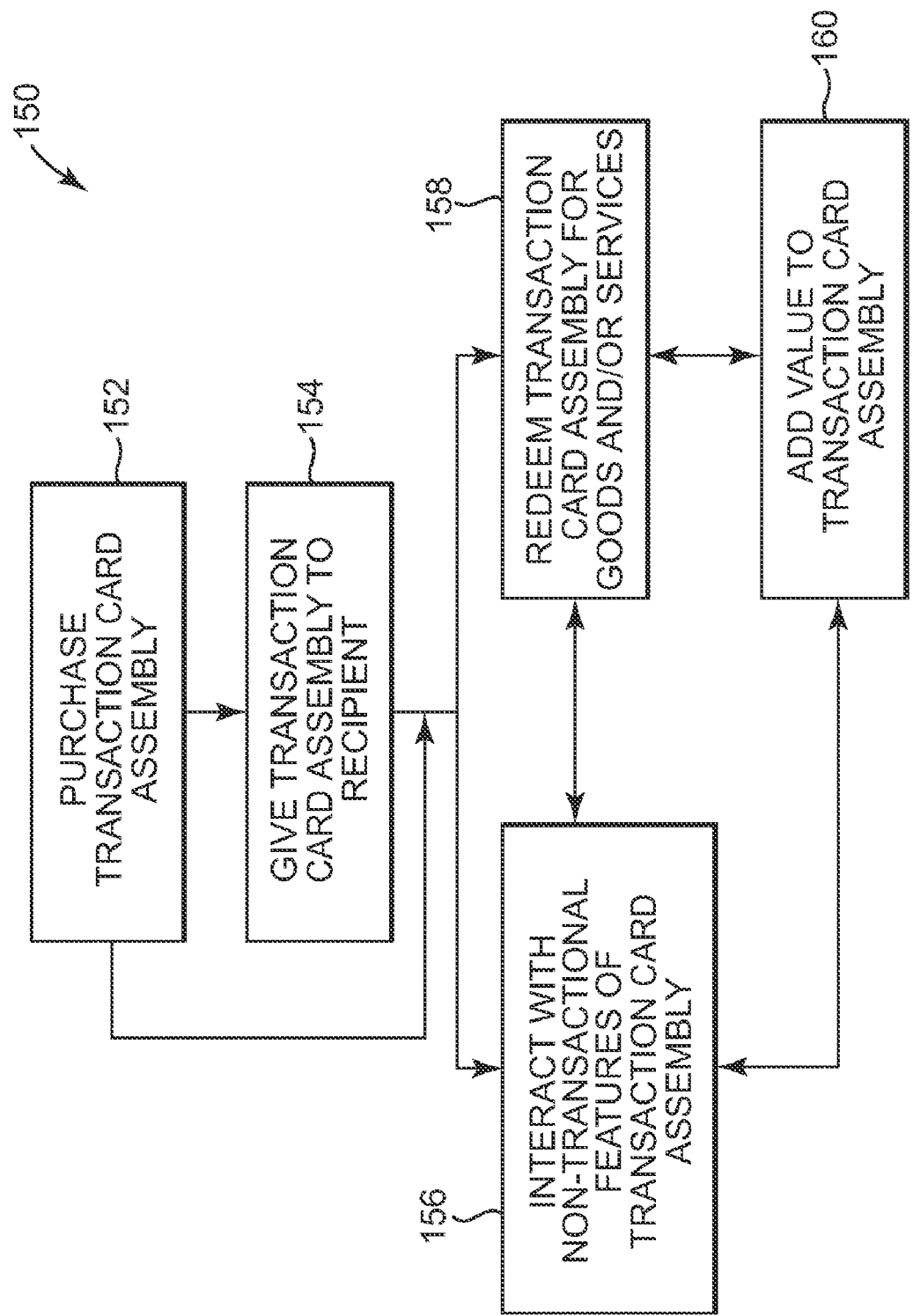
FIG. 10 is a flow chart illustrating a method of using a transaction card assembly, according to one embodiment of the present invention.

FIG. 10 is a flow chart illustrating one embodiment of a method 150 of using transaction card 12 (e.g., FIGS. 1-7). At 152, a potential consumer of transaction card 12, which is displayed in a retail store or viewed on a website, decides to and does purchase transaction card 12 from the retail store or website. It should be understood that transaction card 12 can be displayed and purchased alone or as part of transaction card assembly 10 along with backer 14. Upon purchasing transaction card 12, a retail store employee, a retail store kiosk or other person or device scans account identifier 26 through front opening 52 and rear opening 54 of backer 14 or otherwise reads or accesses account identifier 26 (e.g., FIG. 7). Upon accessing account identifier 26, the account or record linked to account identifier 26 is accessed and activated to load value onto transaction card 12 (i.e., load value to the account or record associated with transaction card 12). In one embodiment, such as where transaction card 12 is purchased at 152 via a website, actual scanning or other mechanical detection of account identifier 26 may be eliminated.

At 154, the consumer optionally gives transaction card 12 to a recipient, such as a graduate, relative, friend, expectant parents, one having a recent or impending birthday, a couple having a recent or impending anniversary or other party. In one embodiment, a plurality of transaction cards 12 are purchased and given to party goers, such as at a birthday party, etc. as party favors or gifts. As an alternative, the consumer can keep transaction card 12 for his or her own use thereby eliminating operation 154.

At 156, the consumer, recipient, or other current bearer of transaction card 12 is able to play with or otherwise use transaction card assembly 10 or at least a portion thereof for non-transactional and/or amusing purposes. More specifically, in one embodiment, the non-transactional purposes of the transaction card assembly 10 include removing article 16 from backer 14 and using it to dress a properly sized doll or for any other suitable play or other purpose generally unrelated to use of transaction card 12 as a payment vehicle. In one embodiment, backer 14 can be partially unfolded and positioned to stand on a support surface such as a table to present additional subject indicia 61 as a background for a child's play with the doll or character.

In one embodiment, the non-transactional purpose includes manipulating backer 14 and/or other items to change what is viewed through viewing aperture 56. For example, a different piece of fabric or clothing item (not shown) may be placed behind viewing aperture 56, which, in the illustrated embodiments, changes the overall appearance of subject 32. In one embodiment, placing a different piece of fabric behind viewing aperture 56 visually appears as a new outfit for the depicted doll or character. Alternatively, backer 14 may be unfolded and held in front of various objects (e.g., a wall, tabletop, or any other scene) such that the particular object appears as the clothing item or other portion of subject 32 depicted through viewing aperture 56.

At 158, the product bearer redeems transaction card 12 for goods and/or services from the retail store or website. At 160, the bearer of transaction card 12 optionally adds value to transaction card 12, more particularly, to the account or record associated with account identifier 26 included therewith, at the retail store or over the Internet (i.e., via the website). Upon playing with at least a portion of transaction card 12 and/or backer 14 at 156 or redeeming transaction card 12 at 158 or adding value to transaction card 12 at 160, the bearer of transaction card 12 subsequently can perform any of operations 156, 158 or 160 as desired. In one embodiment, the ability of the bearer to repeat redeeming transaction card 12 at 158 is limited by whether the account or record linked with transaction card 12 has any remaining value stored or recorded therein at the time of attempted redemption.

Although described above as occurring at a single retail store or website, in one embodiment, purchasing transaction card 12 at 152, redeeming transaction card 12 at 158, and adding value to transaction card 12 at 160 can each be performed at any one of a number of stores adapted to accept transaction card 12 or over the Internet. In one example, a number of stores are each part of a chain or are similarly branded stores. In one example, the number of stores includes at least one website and/or at least one conventional brick and mortar store.

Stored-value cards and other transaction products come in many forms, according to embodiments of the invention. The gift card, like other stored-value cards and transaction products, can be "re-charged" or "re-loaded" at the direction of the original consumer, the gift recipient, or a third party. The term "loading on" or "loaded on" herein should be interpreted to include adding to the balance of an account or record associated with a transaction product. The balance associated with the transaction product declines as the transaction product is used, encouraging repeat visits or use. The transaction product remains in the user's purse or wallet, serving as an advertisement or a reminder to revisit the associated merchant. Transaction products according to embodiments of the invention provide a number of advantages to both the consumer and the merchant. Other transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A transaction card assembly comprising:
   a transaction card including an account identifier fixedly connected thereto, the account identifier being machine readable by a point-of-sale terminal and linking the transaction card to a financial account or record;
   a foldable backer defining an interior surface, an exterior surface opposite the interior surface, and a viewing aperture extending from the interior surface to the exterior surface, wherein the transaction card is coupled to and supported by the exterior surface of the foldable backer, and the viewing aperture is substantially free from obstruction by the transaction card; and
   an article coupled with the interior surface of the foldable backer such that a portion of the article is viewable through the viewing aperture when the foldable backer is in a folded configuration around the article; wherein the article has a larger footprint than the viewing aperture and is the only portion of the transaction card assembly that aligns with and is viewable through the viewing aperture when the foldable backer is in the folded configuration.

2. The transaction card assembly of claim 1, wherein the account identifier is a bar code.

3. The transaction card assembly of claim 1, wherein the account identifier includes at least one of a bar code, a magnetic strip, a smart chip, and a radio frequency identification (RFID) device.

4. The transaction card assembly of claim 1, wherein the transaction card is configured to be viewed substantially simultaneously with the portion of the article viewable through the viewing aperture when the foldable backer is folded around the article, and the portion of the article viewable through the viewing aperture extends at least partially through the viewing aperture and in front of the exterior surface of the foldable backer when the foldable backer is in the folded configuration.

5. The transaction card assembly of claim 1, wherein the foldable backer includes a first panel and a second panel on opposite sides of a fold line, the first panel defines the viewing aperture and supports the transaction card, and the second panel supports the article.

6. The transaction card assembly of claim 5, wherein the first panel includes a first securing component, and the second panel includes a second securing component configured to selectively couple with the first securing component to maintain the foldable backer in the folded configuration.

7. The transaction card assembly of claim 6, wherein the first securing component is one of a hook component and a loop component, the second securing component is the other of the hook component and the loop component, and the first securing component and the second securing component collectively define a hook-and-loop closure.

8. The transaction card assembly of claim 1, wherein the foldable backer is a bi-fold backer defining a front panel and a rear panel separated from the front panel by a fold line, the front panel defines the viewing aperture and a first window, the rear panel defines a second window similarly sized and shaped as and configured to align with the first window when the foldable backer is folded about the fold line, the transaction card is coupled to the front panel such that the account identifier is viewable through the first window and the second window, and the article is coupled with the rear panel.

9. The transaction card assembly of claim 1, wherein:
   the transaction card includes a first planar surface and a second planar surface opposite the first planar surface, the second planar surface facing and being coupled to the exterior surface and including the account identifier, and
   the foldable backer includes two additional apertures positioned to align with one another and the account identifier of the transaction card when the foldable backer is in the folded configuration to provide access to the account identifier through the two additional apertures.

10. The transaction card assembly of claim 9, wherein:
    the two additional apertures are formed separately from the viewing aperture, and
    the two additional apertures are spaced away from any portion of a footprint of the viewing aperture when the foldable backer is in the folded configuration.

11. A transaction card assembly comprising:
    a transaction card including an account identifier fixedly connected thereto, the account identifier being machine readable by a point-of-sale terminal and linking the transaction card to a financial account or record;
    a foldable backer supporting the transaction card and defining an interior surface, an exterior surface opposite the interior surface, and a viewing aperture extending from the interior surface to the exterior surface, wherein the viewing aperture is substantially free from obstruction by the transaction card; and
    an article coupled with the interior surface of the foldable backer such that a portion of the article is viewable through the viewing aperture when the foldable backer is in a folded configuration around the article;
    wherein the foldable backer includes backer subject indicia on the exterior surface adjacent the viewing aperture, the backer subject indicia depicts a first portion of a subject, the viewing aperture is sized and shaped to specifically correspond with a second portion of the subject, and the portion of the article viewed through the viewing aperture visually appears as the second portion of the subject such that the first portion of the subject and the second portion of the subject collectively appear as a larger portion of the subject.

12. The transaction card assembly of claim 11, wherein the subject includes a character, the first portion of the subject includes limbs of the character, the second portion of the subject includes a clothed main body of the character.

13. The transaction card assembly of claim 12, wherein the article is a clothing item configured to be worn by a doll visually resembling the character.

14. The transaction card assembly of claim 11, wherein a surface of the transaction card opposite the foldable backer includes card subject indicia depicting a third portion of the subject positioned adjacent at least one of the first portion of the subject and the second portion of the subject such that the first portion, the second portion, and the third portion collectively depict the subject.

15. The transaction card assembly of claim 14, wherein the subject includes a character, the first portion of the subject includes limbs of the character, the second portion of the subject includes a clothed main body of the character, and the third portion of the subject includes a head of the character.

16. A transaction card assembly comprising:
a transaction card including an account identifier fixedly connected thereto, the account identifier being machine readable by a point-of-sale terminal and linking the transaction card to a financial account or record;
a foldable backer supporting the transaction card and defining an interior surface, an exterior surface opposite the interior surface, and a viewing aperture extending from the interior surface to the exterior surface, wherein the viewing aperture is substantially free from obstruction by the transaction card; and
an article coupled with the interior surface of the foldable backer such that a portion of the article is viewable through the viewing aperture when the foldable backer is in a folded configuration around the article;
wherein the article is a fabric article and partially extends through the viewing aperture and in front of the exterior surface of the foldable backer when the foldable backer is in the folded configuration.

17. The transaction card assembly of claim 16, wherein the fabric article is an unpackaged clothing item.

18. The transaction card assembly of claim 17, further comprising a fastener extending through the fabric article and the foldable backer to couple the fabric article to the foldable backer.

19. The transaction card assembly of claim 18, wherein the fastener is a first fastener positioned on a first side of the viewing aperture when the foldable backer is in the folded configuration, and the transaction card assembly further comprises a second fastener extending through the fabric article and the foldable backer to couple the fabric article to the backer, wherein the second fastener is positioned on a second side of the viewing aperture opposite the first side.

* * * * *